United States Patent

Sommerfeld

[15] 3,676,526

[45] July 11, 1972

[54] POLYMERIC DISPERSION OF A DIENE-ACRYLONITRITE GRAFT COPOLYMER WITH A DIFFERENT GRAFT COPOLYMER

[72] Inventor: Eugene G. Sommerfeld, 1250 Providence Road, Apt. 91A, Secane, Pa. 16346

[22] Filed: Feb. 2, 1970

[21] Appl. No.: 8,067

Related U.S. Application Data

[63] Continuation-in-part of Ser. No. 643,049, June 2, 1967, abandoned.

[52] U.S. Cl. .................260/876 R, 117/132 C, 117/132 CB, 260/31.2 MR, 260/32.8 A, 260/33.6 A, 260/33.8 UA, 260/836, 260/879, 260/880
[51] Int. Cl. ................................................C08d 9/08, C08d 9/16
[58] Field of Search..............................260/876, 34.2, 33.6 A

[56] References Cited

UNITED STATES PATENTS

| | | | |
|---|---|---|---|
| 3,405,087 | 10/1968 | Fryd | 260/33.6 |
| 3,509,237 | 4/1970 | Aubrey | 260/876 |
| 3,502,744 | 3/1970 | Weitzel et al. | 260/876 |
| 3,314,904 | 4/1967 | Burkus | 260/4 |
| 3,074,906 | 1/1963 | Calvert | 260/45.5 |
| 3,449,471 | 6/1969 | Weitzel et al. | 260/880 |

Primary Examiner—Samuel H. Blech
Assistant Examiner—J. Seibert
Attorney—Fred F. Butzi

[57] ABSTRACT

A dispersion of two different types of graft copolymers in an organic liquid. One of the types has a polymeric diene backbone component and a nitrile graft component; the other type has an unsaturated polymer backbone component and a graft component which is a polymer of a graft copolymerizable vinyl monomer.

The dispersion is useful as a coating composition, particularly for coating cans.

6 Claims, No Drawings

POLYMERIC DISPERSION OF A DIENE-ACRYLONITRITE GRAFT COPOLYMER WITH A DIFFERENT GRAFT COPOLYMER

CROSS-REFERENCE TO RELATED APPLICATIONS

This application is a continuation-in-part of application Ser. No. 643,049, filed June 2, 1967, now abandoned.

BACKGROUND OF THE INVENTION

There has been increasing interest in graft copolymers in recent years, particularly as film-forming components in coating compositions. These coating compositions have generally taken the form of polymer dispersions in organic liquids, the so-called "organosols."

For many purposes, it's desirable to blend two chemically different graft copolymers so that one gets a balance of properties in the product. Generally speaking, it is undesirable to blend two such different graft copolymers in an organosol because the polymers tend to separate into phases when the dispersion is laid down as a film.

The organosols of this invention not only minimize these difficulties, but also give films with exceptional impermeability, toughness and flexibility.

SUMMARY OF THE INVENTION

The organosols of the invention contain two chemically different types of graft copolymers, A and B.

Graft Copolymer A

This graft copolymer has a diene polymer backbone component. Illustrative of suitable diene polymers are 1,2-or 1,4-polybutadiene (both the cis and trans forms), polyisoprene or polychloroprene.

Copolymers of diene monomers with up to 50 percent by weight of other vinyl monomers can also serve as backbones. Illustrative of these other monomers are aromatic vinyl compounds such as styrene, α-methyl styrene and vinyl toluene; acrylic acid, methacrylic acid and their amides, nitriles and esters with alcohols of one through 18 carbon atoms; ethylene and propylene; vinyl esters of monocarboxylic acids of one through 18 carbon atoms, such as vinyl acetate, vinyl butyrate and vinyl stearate; and vinyl halides such as vinyl chloride, vinylidene chloride, vinyl fluoride and vinylidene fluoride.

The graft component of copolymer A can be a polymer of an ethylenically unsaturated nitrile, preferably a nitrile represented by the structure

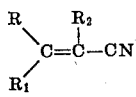

where
R and R₁ can be hydrogen, phenyl, tolyl, benzyl or alkyl of one through 18 carbon atoms,
and
R₂ can be hydrogen or methyl.

Copolymers of these nitriles as well as their copolymers with up to 50 percent by weight of other monomers such as maleic anhydride, aminoethylvinyl ether and dimethylaminoethyl methacrylate can also serve as graft components. The preferred graft copolymer A has a polybutadiene backbone component and a polyacrylonitrile or polymethacrylonitrile graft component. The organosols can contain one or more of the A type of graft copolymer.

Graft Copolymer B

Any unsaturated polymer will serve as a backbone for graft copolymer B.

As with the A polymer, the backbone can be a diene polymer such as 1,2-or 1,4-polybutadiene, polyisoprene or polychloroprene. Copolymers of these dienes with up to 95 percent by weight of other copolymerizable vinyl monomers can also be used. Illustrative of these other monomers are those correspondingly listed for the A copolymer.

The graft component for the B copolymer can be a polymer or copolymer of any vinyl monomer(s) that will graft copolymerize with the backbone component. Illustrative of such monomers are ethylenically unsaturated nitriles; other vinyl monomers such as acrylic acid, methacrylic acid and their amides and esters with alcohols of one through 18 carbon atoms; glycidye methacrylate; fumaric acid; itaconic acid; vinyl esters of monocarboxylic acids of one through 18 carbon atoms such as vinyl acetate, vinyl butyrate and vinyl stearate; vinyl halides such as vinyl chloride, vinylidene chloride, vinyl fluoride and vinylidene fluoride; and aromatic vinyl compounds such as styrene, vinyl toluene and α-methyl styrene.

The organosols of the invention can contain one or more of the B type of graft copolymer.

Graft copolymers with ethyleneically unsaturated nitrile polymer grafts can be prepared as described in copending application Ser. No. 756,360 filed Aug. 30, 1968, now abandoned. Graft copolymers with other vinyl polymer grafts can be prepared as described in "Block and Graft Copolymers," W. J. Burlant and A. S. Hoffmann, Reinhold Publishing Company, 1960.

The Organic Liquid

The liquid used in the compositions of the invention can be any organic liquid, or mixture of liquids, that will dissolve the backbone component of each graft copolymer present. The liquid must, of course, also be satisfactory for the dispersion's intended use.

Illustrative of such liquids are aromatic and aliphatic hydrocarbons, halogenated hydrocarbons, ketones and esters.

Graft copolymers A and B are generally present in the compositions in weight ratios of 1-20/1-20 to each other, preferably 1-5/1-5.

The compositions generally contain from about 20 percent to about 50 percent by weight, of solids.

How the Compositions Are Made

The graft copolymers used are ordinarily prepared in organosol form. The compositions of the invention are made by simply bringing together organosols of the different types of graft copolymers and thoroughly mixing them.

UTILITY

The organosols of the invention are useful as coating compositions. For example, they can be used as wire enamels and in the preparation of flame-retardant primer and industrial maintenance paints. The dispersions are especially useful as coatings for beverage cans, where their adhesion to metal and their impervious nature prevent the can contents from taking on objectionable flavors and odors.

While the organosols are entirely satisfactory for these uses, it may sometimes be desirable to blend them with pigments, plasticizers, coalescing aids and the like, in the usual ways and in the usual amounts.

When used as coating compositions, the organosols can be sprayed, brushed or rolled on suitable substrates and then air-dried. The resulting films should then be heated at temperatures of from 300° to 450° F. for from 10 – 30 minutes to cross-link the polymers. The polymers can also be cross-linked by radiation, free radical polymerization or with metallic drying compounds such as cobalt salts.

DESCRIPTION OF THE PREFERRED EMBODIMENTS

In the following example, all parts are by weight.

A. Fifty parts of polybutadiene, 50 parts of acrylonitrile, 160 parts of mineral spirits and 0.15 part of tertiary butyl perpivalate were mixed, stirred, and heated to 85° C. The temperature of the reaction mass rose to 92° C. and was kept at that temperature for one hour and 15 minutes. The mixture was then allowed to cool to room temperature.

The resulting dispersion of graft copolymer having a polybutadiene backbone component and an acrylonitrile graft component in a backbone/graft ratio of 67/33, contained 30 percent polymer solids.

B. Fifty-four and 4/10 parts of polybutadiene, 22.8 parts of butyl methacrylate, 18.2 parts of methyl methacrylate and 4.6 parts of acrylic acid were mixed. To the mixture was added one part of tertiary butyl perpivalate. The mixture was diluted with enough mineral spirits to bring the solids content of the mixture to about 43.9 percent.

This mixture was heated to about 80° C. and held at that temperature for about 2 hours. At the end of this 2-hour period, a second addition of 0.5 part of tertiary butyl perpivalate was made. The mixture was held at 80° C. for another two hours to give a dispersion of a graft copolymer having a polybutadiene backbone and a graft component of a butyl methacrylate/methyl methacrylate/acrylic acid 50/40/10 terpolymer.

C. The dispersions prepared in (A) and (B) were blended in a 1:1 ratio to give a stable organosol.

This organosol was roller coated on a tin-free steel panel, air-dried and baked at 390°–400° F. for about 12 minutes to give a film having excellent heat resistance and good flexibility. This panel was then made into a beverage can using nylon 11 as a sealer. The bond between the film and nylon 11 was good.

The dispersion prepared in (A) can be similarly blended in a 1/1 ratio with a dispersion of a graft copolymer having a polybutadiene backbone and a graft component which is a lauryl methacrylate/acrylic acid 80/20 copolymer, prepared as in (B), with substantially the same results.

It is to be understood that organosols of any of the polymers listed in the forepart of this specification can be substituted, in equivalent proportions, for the organosols in the foregoing description. When processed similarly, the resulting organosols will have substantially the same properties as those described.

I claim:
1. A dispersion of
   a. at least one graft copolymer with a polymeric diene backbone component and a graft component which comprises a polymer or copolymer of an ethylenically unsaturated nitrile,
   and
   b. at least one graft copolymer, different from that in (a), having a polymeric diene backbone component and a graft component comprising a polymer or copolymer of an ethylenically unsaturated nitrile; acrylic acid, methacrylic acid and their amides and esters with alcohols of one through 18 carbon atoms; glycidyl methacrylate; fumaric acid; itaconic acid; a vinyl ester of a monocarboxylic acid of one through 18 carbon atoms; vinyl chloride; vinylidene chloride; vinyl fluoride; vinylidene fluoride; styrene; vinyl toluene or α-methyl styrene,
   in an organic liquid which is a solvent for the backbone components in (a) and (b) the weight ratios of (a) and (b) being 1-20/1-20.
2. The dispersion of claim 1 wherein the nitrile in (a) is represented by the formula

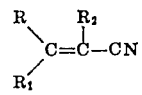

where
   R and $R_1$ can be hydrogen, phenyl, tolyl, benzyl or alkyl of one through 18 carbon atoms,
   and
   $R_2$ can be hydrogen or methyl.
3. The dispersion of claim 2 where the nitrile in (a) is acrylonitrile or methacrylonitrile.
4. The dispersion of claim 1 wherein the diene backbone in (a) is polybutadiene.
5. The dispersion of claim 2 wherein the diene backbone in (a) is polybutadiene.
6. The dispersion of claim 3 wherein the diene backbone in (a) is polybutadiene.

* * * * *